Aug. 19, 1969  F. W. PEPE  3,461,708
METHOD OF FORMING CONDUIT CLAMPS
Filed Nov. 2, 1967  4 Sheets-Sheet 1

INVENTOR
Frank W. Pepe
BY *Morton D. Wittstein*
ATTORNEY

Aug. 19, 1969        F. W. PEPE        3,461,708

METHOD OF FORMING CONDUIT CLAMPS

Filed Nov. 2, 1967        4 Sheets-Sheet 2

INVENTOR.
Frank W. Pepe
BY Martin P. Wittstein
ATTORNEY

Aug. 19, 1969　　　F. W. PEPE　　　3,461,708

METHOD OF FORMING CONDUIT CLAMPS

Filed Nov. 2, 1967　　　4 Sheets-Sheet 3

INVENTOR.
Frank W. Pepe
BY
Martin D. Wittstein
ATTORNEY

Aug. 19, 1969         F. W. PEPE         3,461,708
METHOD OF FORMING CONDUIT CLAMPS
Filed Nov. 2, 1967                         4 Sheets-Sheet 4

Fig. 14

INVENTOR.
Frank W. Pepe
BY Martin P. Wittstein
ATTORNEY

United States Patent Office 3,461,708
Patented Aug. 19, 1969

3,461,708
METHOD OF FORMING CONDUIT CLAMPS
Frank W. Pepe, Lordship, Conn., assignor to Arc-Co Incorporated, Bridgeport, Conn., a corporation of Connecticut
Filed Nov. 2, 1967, Ser. No. 680,252
Int. Cl. B21d 21/00, 28/06, 53/36
U.S. Cl. 72—332
15 Claims

ABSTRACT OF THE DISCLOSURE

A method of continuously forming single hole conduit clamps from flat strip stock wherein pairs of elongate clamps are blanked in end to end adjacent relationship either completely or only partially across the width of the strip stock and sequentially formed in even numbered multiples by intermittent feeding of the stock through a progressive die punch press. Individual clamp blanks are partially severed from each other leaving a central carry through portion of the strip, either within or beyond the clamp blank length, then progressively die formed by deformation from the free end of each clamp blank toward the center of the strip, and finally severed from the strip in multiples of diagonally or end to end adjacent pairs of finished clamps by punching alternate diagonally adjacent pairs of clamps in opposite directions, or by punching out a central carry through portion between end to end adjacent clamps.

Cross references

This application discloses and claims a novel method of making conduit clamps of the type disclosed and claimed in my copending patent application Ser. No. 661,881, filed Aug. 21, 1967.

Brief summary

This invention relates generally to the metal working art and more particularly to an improved method of making metal conduit clamps by sequential forming of flat strip stock in a progressive die punch press.

As more fully disclosed in my above identified copending patent application, the type of clamp to which the present invention relates is a single hold unitary clamp which is utilized in vast quantities in commercial and residential structures for securing pipe, conduit, cable, etc. to a flat supporting surface such as a wall or ceiling, or to the surfaces of structural members in such buildings.

The above mentioned clamp is formed from a flat elongate metal strip and generally comprises a flat end portion having a raised annular reinforcing area surrounding an aperture through the flat end portion, the aperture being adapted to receive a securing member such as a screw or bolt for securing the clamp to the supporting surface. Integrally secured to the flat end portion is a substantially semi-circular hook portion adapted to fit over a pipe or conduit for which the hook portion is appropriately sized, the hook portion being joined to the flat end portion at a juncture defined by substantially a right angle in the metal strip. The clamp is preferably provided with a pair of parallel reinforcing raised ribs which extend over the entire hook portion and into the flat end portion and there merge with the raised annular area surrounding the aperture. A dimple or other suitable projection may be provided on the inner surface of the hook portion, either adjacent the juncture thereof with the flat end portion or at the free end of the hook portion, the dimple cooperating with the opposite end of the hook portion to define an entryway for the pipe or conduit which is slightly less than the diameter of the pipe, so that the clamp has a resilient snap-over-center press fit on the pipe and will remain where it is placed thereon before being secured to the supporting surface. Also, the raised annular area is provided with an integrally formed annular extension or ring which extends in a direction opposite to that of the raised annular area and terminates in a seating surface substantially in the plane of the seating surface of the flat end portion, thereby serving to prevent collapse of the raised annular area when the flat end portion is secured to the supporting surface.

Heretofore in the continuous manufacture of clamps of the type above described, it is customary to make each clamp by sequentially carrying out a series of forming operations on a flat strip of metal stock which is intermittently fed through a progressive die punch press. Strip stock is selected which has a width corresponding to the desired width of the finished clamp. The strip stock is then fed to the punch press a linear distance, for each operation of the press, which is equal to the length of the clamp blank before any hook defining curvature is applied thereto. As the strip stock advances through the several forming stations of the progressive die, the operations required to form the aperture, the ribs and the dimple are carried out in sequence, after which the still flat clamp blank is severed from the strip and the hook defining curvature is then applied to the flat blank while it is in the same location in the die as it was when severed from the strip.

In the above described prior art methods, the final curvature of the hook portion of the clamp is formed either in a stationary lower die having an upwardly opening cavity into which a punch descends, or on a stationary lower punch over which a die having a downwardly opening cavity descends. In either case, it is necessary to sever the flat clamp blank from the strip before the forming operation takes place, otherwise the strip, with the clamp blank still attached thereto, cannot be fed to the next working position. This is so for the reasons that, if the strip is fed over a stationary lower die having an upwardly opening cavity, the strip will not feed properly over a pilot pin which projects upwardly from the die in advance of the cavity, the pilot pin being necessary to engage in the aperture in the strip to hold the strip stationary when the punch descends so as to force the metal to flow into the cavity only from the free end of the strip. Also, even if the strip were forced over the pilot pin during feeding until the pilot pin engaged the next aperture, once the hook portion was formed there would be no way of removing the hook portion from the cavity without seriously bending the strip, thereby resulting in very complicated feeding and guiding problems and possible damage to the finished clamp.

On the other hand, if the strip is fed over a stationary lower punch over which a die having a downwardly facing opening descends, it is apparent that the punch presents a complete barrier to the passage of the strip. And again, even if the strip were forced over the punch, it would be impossible to further feed the strip without seriously bending it to remove the hook portion of the finished clamp from the punch.

Is is therefore apparent that it is extremely difficult, if not virtually impossible, to form the clamp in the prior art process while the clamp blank is still connected to the strip due to the problems encountered in attempting to form the clamp in the same plane in which the strip is fed. It therefore becomes necessary to first sever the clamp blank from the strip so that it can be shifted from the feeding plane of the strip to a different plane for forming. Thus severing is usually accomplished by shearing with the movable punch or die member as the case may be. However, it is still necessary to use a pilot pin which is engaged in the aperture of the clamp blank to hold one end of the blank so that all of the metal for the hook portion flows from the other end of the blank, thereby maintaining a fixed area of flat end portion of the blank surrounding the aperture.

A great number of problems arise, and difficulties and disadvantages result, from forming the hook portion of the clamp after the clamp blank has been severed from the strip, all of which generally result in low production and inferior quality. Firstly, by virtue of the fact that the clamps are initially blanked out longitudinally of the strip stock, the production rate of a given punch press, when making a given size clamp, is limited by two factors, namely the cycle time of the press and the cycle time of the stock feeding mechanism to feed the required increment of stock. Since the press can deliver only one finished clamp for each operating cycle of the press and stock feeding mechanism, maximum production rate is achieved, for the particular clamp on the particular press, when the above factors have been adjusted for maximum rate of operation.

Secondly, a number of factors contribute to poor quality of clamps formed by the prior art methods, of which a significant one is poor sizing of the clamp due to variations in setting. This results from the fact that the entire curvature of the hook portion must be formed in a single deep forming operation on the flat blank. The inherent spring-back in the metal of the strip causes variations in the degree of final curvature or setting of the hook portion with the result that exact uniformity of clamp size is often difficult if not impossible to achieve. Another significant disadvantage of the prior art methods is that there is poor control of the positioning of the clamp blank over and in the die once the clamp blank has been severed from the strip. The pull on both ends of the clamp blank during deformation of the metal to form the hook portion is so severed that frequently the aperture is stretched into a somewhat elongate shape, with the result that dimensions cannot be maintained and the metal around the aperture may be weakened. Therefore the prior art methods are limited to relatively small size clamps and the use of relatively soft metals.

Still other problems which arise in the prior art methods are that it is impossible to form sharp deep ribs with small radius edges in the hook portion forming dies due to the flow of metal around the die surface. And it is extremely difficult to form such ribs while the clamp blank is still flat and connected to the strip unless a small area of the strip is notched out where the rib or ribs at one end of one clamp blank contact the other end of the adjacent clamp blank which is not to be ribbed, thereby causing wastage of material. Also, relatively movable clamp ejecting parts and actuating mechanism therefor are required, thereby increasing the cost of the punch press dies. Still further, the use of very narrow strip stock (equal to the width of the finished clamp), is considerably more expensive than wider strip stock due to the great amount of slitting which must be done to the relatively wide stock which emerges from the rolling mills as raw material.

All of the foregoing disadvantages and difficulties, as well as others, of the prior art methods are materially reduced or entirely avoided by the practices of the present invention which, in its broader aspects, comprises the steps of intermittently feeding a flat strip stock past a plurality of serially arranged working stations at which a plurality of working operations are simultaneously carried out during the dwell portions of the intermittent feeding of the strip, forming at a first working station at least one pair of end to end adjacent clamp blanks such that each clamp blank of the pair extends from an opposite side edge of the strip stock toward the center thereof and such that each clamp blank of the pair is separated from the strip stock along the side edge of each clamp blank over at least a major portion of its length from the opposite side edges of the strip stock toward the center thereof, deforming at a subsequent working station each clamp blank of the pair to provide a substantially semi-cylindrical curvature therein which extends from the free end edge of each clamp blank toward the center of the strip stock over a major portion of the separated portion of each clamp blank to provide at least one pair of finished clamps still integrally connected to the strip stock, and severing at a terminal working station at least the terminal pair of finished clamps along the unseparated end edge of the terminal pair of finished clamps so that at least two individual clamps are simultaneously separated from the strip stock and from each other.

In briefly considering some of the more specific aspects of the present invention, and particularly in connection with a presently preferred practice of the invention, a suitable metal strip stock is intermittently fed between the punch and die parts of any suitable reciprocating progressive die punch press in which the several clamp forming operations are simultaneously carried out during the dwell portions of the intermittent feeding. The initial clamp blank forming is accomplished preferably by coining the opposite surfaces of the strip along the centerline of the strip and laterally across the strip from side edge to side edge at spaced intervals along the strip, thereby defining the longitudinal edges and one end edge of at least one pair of elongate end to end adjacent clamp blanks, the other end edge of each clamp blank being defined by the side edges of the strip stock. Next, an aperture is punched through each clamp blank adjacent the centerline of the strip after which the strip is severed or lanced along a major portion of the length of the lateral coining notches from the side edges of the strip stock toward the centerline thereof, a relatively short length of the lateral coining notches, as well as the coined portion of the strip centerline, being left unsevered in order to provide an integral carry through portion of the strip which maintains the partially severed clamp blanks together in strip form. Preferably, one or more elongate reinforcing ribs are formed to extend over a major portion of each clamp blank, and the raised annular reinforcing area surrounding the aperture is simultaneously formed with the elongate ribs. At this point a complete flat clamp blank is formed.

The next significant step in the practice of the invention is the deformation of the pair of clamp blanks to form the semi-cylindrical hook portions of the finished clamps. This deformation is carried out preferably in at least two forming stages at separate working stations, with the metal of each blank of the pair being drawn from the free end edge of each clamp blank toward the center of the strip. Thus in the first state a partial curvature is imparted to each blank over a major portion of the severed length of each blank with the metal being caused to flow into each die cavity from the free end of each blank toward the center of the strip. The strip is then advanced one increment of movement so that the partially formed clamps shift laterally from the partial forming station to the full forming station, where the previous operation is repeated but this time imparting the full semi-cylindrical curvature to each partially formed clamp. At this point a pair of complete clamps is formed although they are still integrally connected to the strip.

The final step in the process is the severing of the pair of fully formed clamps from the strip in such a manner that the pair of clamps is severed from the strip of partially formed clamps and simultaneously therewith the individual clamps of the pair are severed from each other, both severing operations being simultaneously carried out by a single movement of the reciprocating member of the punch press. This is accomplished, in the preferred practice of the invention, by severing a terminal pair of diagonally adjacent fully formed clamps along the unsevered side edge portion of each such diagonally disposed pair of clamps and also along the common end edge of the terminal pair of end to end adjacent clamps, it being understood, as more fully explained below, that one of the unsevered clamps is common to both of the aforementioned diagonally and end to end adjacent pairs of clamps.

As will be more readily apparent from the detailed description which follows, two particularly advantageous features are achieved by the practice of the present invention: One is that the clamps are formed simultaneously in opposed end to end adjacent pairs and are severed from the strip in like manner, with the result that very substantial increases in unit production of clamps is achieved, with the minimum increase being double that of conventional methods. As more fully explained hereinafter, any even numbered multiple of clamps desired may be formed and severed from the strip with each operating cycle of the punch press since it is possible to feed the strip in increments of as many pairs of opposed clamp blanks as desired and to carry out the several forming operations simultaneously on a corresponding number of pairs of clamp blanks, the only limitation being the practical size of the dies which a punch press can handle. Thus, by the unique arrangement of severing punches and dies hereinafter described, twice as many finished clamps are simultaneously severed from the strip and from each other as the number of pairs of clamp blanks which are advanced for each operation of the press, thereby rendering possible, as a practical matter, production increases of four to eight times that of prior art methods.

Another highly advantageous feature is that all of the necessary operations for forming a pair of opposed finished clamps are performed while the clamp blanks are still integrally connected to the strip which is intermittently moving through the progressive dies laterally in relation to the individual clamp blanks, with the result that very high quality clamps are produced by this method. Since the forces acting on the connected clamp blanks are opposed and balanced across the centerline of the strip, excellent positioning of the blanks in the dies can easily be maintained so that the finished clamps are free from metal working defects. Also, since the curvature of the hook portion can readily be formed in more than one stage, variations in setting are substantially eliminated thereby achieving more accurate and uniform sizing from clamp to clamp.

In addition, other advantages are obtained, which overcome the aforementioned shortcoming of prior art methods, such as more accurate configuration of rib formations, elimination of costly ejecting mechanism from the punch press, reduction or elimination of material waste and reduction in material cost through the use of wider strip stock.

Having now described the general nature and several specific aspects of the present invention, it is a principal object thereof to provide an improved method of making single hole conduit clamps.

It is another object of the present invention to provide a method of making single hole conduit clamps in which all operations necessary for forming a pair of opposed clamps are carried out while the clamp blanks are still integrally connected to a strip of clamp blanks which is intermittently moving through progressive dies.

It is still another object of the present invention to provide a method of making single hole conduit clamps in which finished clamps are produced in any desired even numbered multiple for each operating cycle of the punch press.

It is yet another object of the present invention to provide a method of making single hole conduit clamps in which deformation of a portion of the clamp blank is carried out in a plurality of forming stages from flat to final full curvature.

It is a further object of the present invention to provide a method of making single hole conduit clamps in which a considerably wider strip stock can be used than the width of an individual clamp.

It is still a further object of the present invention to provide a method of making single hole conduit clamps which eliminates the need for complex and costly die ejecting parts and actuating mechanisms therefor.

It is another object of the present invention to provide a method of making single hole conduit clamps which is highly efficient, relatively simple, and which produces clamps of uniform high quality.

These and other objects and advantages of the present invention will become more apparent from an understanding of the following detailed description of presently preferred practices of the invention when considered in conjunction with the accompanying drawings in which:

Detailed description

Referring now to the drawings and particularly to FIGS. 1 through 4, the method of the present invention begins with a strip of metal 10 which is relatively wide in comparison to its thickness and is of indefinite length. The strip 10 is intermittently fed in predetermined increments between the stationary die member 12 and the reciprocating punch holder 14 of any suitable punch press which operates in conjunction with a suitable strip feed mechanism to cause the due member and punch holder to come together for a metal forming operation during the dwell periods of the intermittent feeding of the strip. Since the details of the strip feed mechanism and the punch press form no part of the present invention, they are not further described or shown herein.

Figure 4:
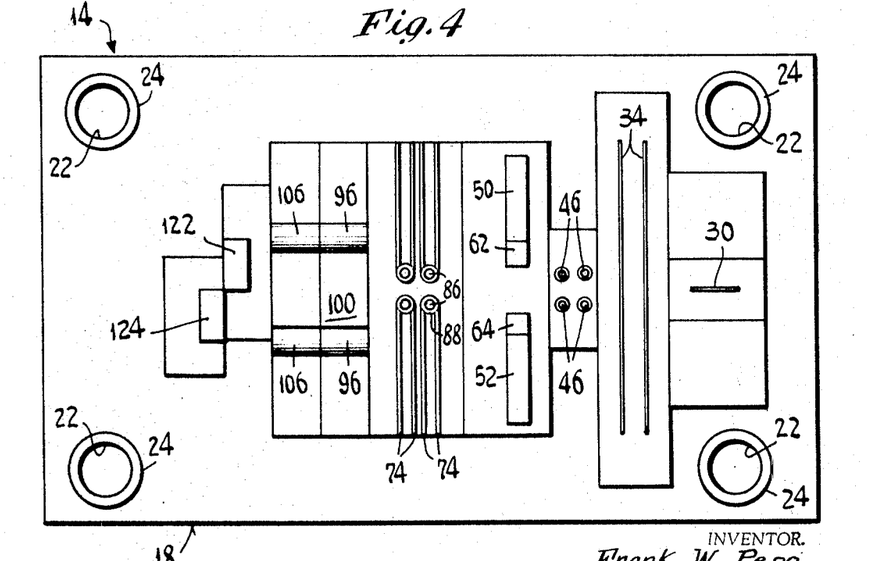
FIG. 4 is a bottom view on a reduced scale of a reciprocating male punch holder adapted to cooperate with the die member shown in FIG. 3.

It should be understood that the punch member 14 as shown in FIG. 4 is mounted over the die member 12 by turning the punch holder up side down so that the forming surfaces of each member are adjacent and the edge 16 of the die member is coincident with the edge 18 of the punch holder. The die is provided with a plurality of upstanding posts 20 over which apertures 22 and heavy guide rings 24 on the punch holder slide in order to maintain proper alignment of the several forming surfaces hereinafter described as the two members engage and disengage with the strip stock therebetween when the punch press reciprocates the punch holder 14.

It should also be understood that in the practices of the invention hereinafter described, the progressive die and punch members are formed to perform each operation simultaneously on two pairs of clamp blanks, the strip stock being fed an increment of the width of two clamp blanks with each feeding operation, so that for each operating cycle of the press, four clamp blanks are formed and four finished clamps are severed from the strip. Also, for the purpose of more easily comparing the several working stations of the die and punch members 12 and 14 with the corresponding work performed on the strip 10, both the die member shown in FIG. 3 and the strip stock shown in FIG. 1 have been provided with guide numbers 1–24 reading from right to left, these numbers being spaced in accordance with the width of a clamp blank both on the die member and the strip stock.

Figure 1:
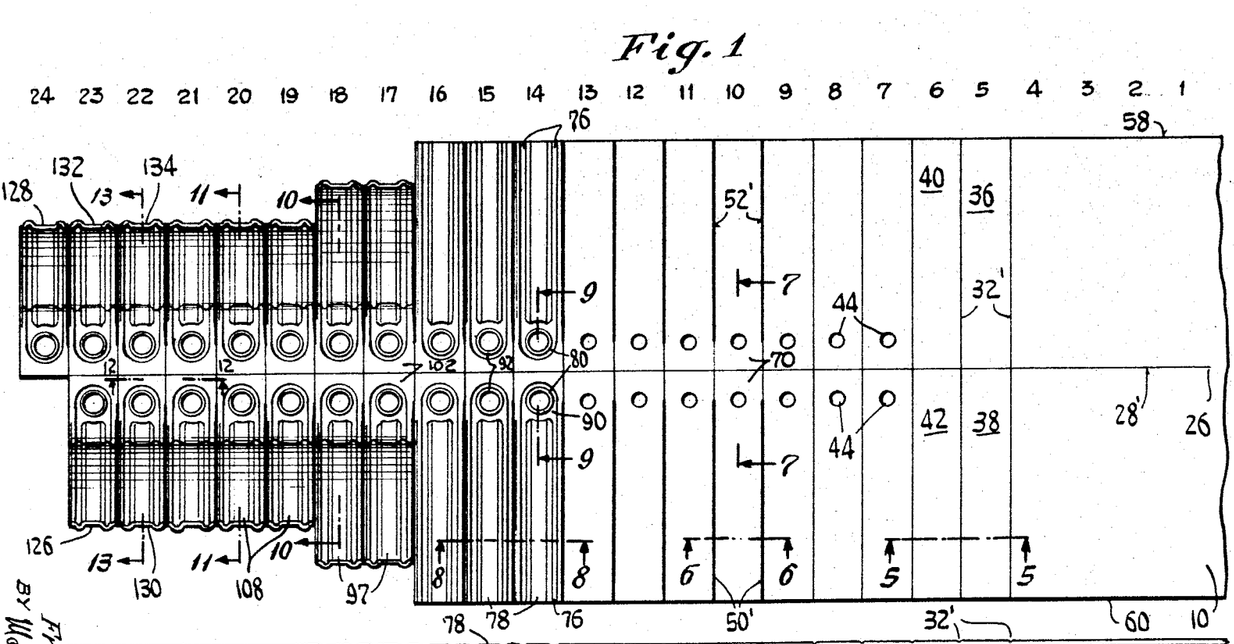
FIG. 1 is a plan view of a strip formed by one form of the practice of the present invention, showing the successive stages of forming of the clamp blanks from raw material to finished clamps ready for severing from the strip.
Figure 3:
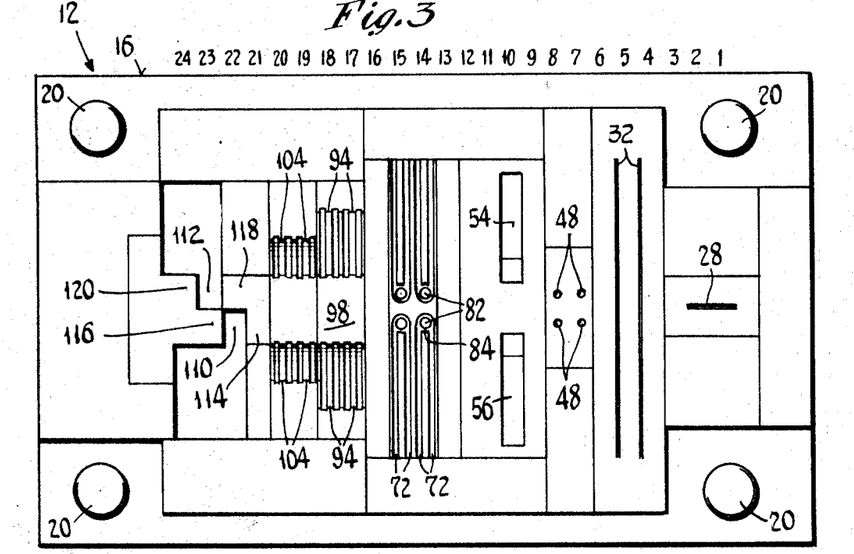
FIG. 3 is a plan view on a reduced scale of a stationare female die member for carrying out the several metal working operations which are performed on the strip stock shown in FIG. 1 and FIG. 2.

The first general step performed on the strip stock 10 is the forming of flat clamp blanks in end to end adjacent relationship across the strip. This is preferably accomplished by coining the strip stock 10 along its centerline 26, the coining being done by elongate coining punches 28 and 30 on the die member and punch holder 12 and 14 respectively. As seen in FIGS. 1 and 3, the longitudinal coining takes place over the area occupied by the clamp blanks indicated by guide numbers 1 and 2. The coining punches 28 and 30 impress a V-shaped notch into the opposed surfaces of the strip 10, indicated by the line 28' on the surface shown in FIG. 1.

The clamp blank area indicated by the guide number 3 is a nonworking position on the die member and punch holder due to the practical necessity of providing sufficient space between working stations on the die and punch members to convert from one type of working operation to another without interference therebetween.

Figure 5:
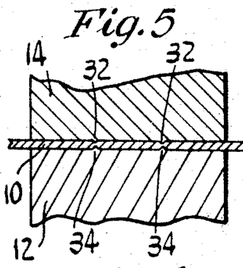
FIGS. 5–13 are sectional views on an enlarged scale taken on the lines 5—5 to 13—13 of FIG. 1 which show the strip stock in the several forming stages with corresponding portions of the dies and punches of FIGS. 3 and 4 superimposed under and over the strip stock.

Further coining punches 32 and 34 are provided and on the die and punch members 12 and 14 respectively, these coining punches being located respectively between the clamp blank areas indicated by the guide numbers 4 and 5, and 5 and 6, and being shown in more detail in FIG. 5. The coining punches 32 and 34 extend across the full width of the strip stock 10 and produce the lateral coined notches 32' shown in FIG. 1 as well as a corresponding pair of lateral coined notches on the opposite surface of the strip stock 10. It will be seen that from this operation a plurality of rectangular areas 36, 38, 40 and 42 are blanked out on the opposed surfaces of the strip stock 10, the areas 36 and 38 constituting a first pair of elongate end to end adjacent clamp blanks and the areas 40 and 42 constituting a second pair of elongate end to end adjacent clamp blanks, each pair extending across the full width of the strip 10, with each clamp blank being bounded on three sides by coined notches and on the fourth side by a side edge of the strip stock.

The next operation takes place in the clamp blank areas indicated by the guide numbers 7 and 8 where apertures 44 are punched through the strip stock 10 closely adjacent the centerline 26. The apertures 44 are formed by means of punches 46 carried by the punch holder 14 which mate with apertures 48 formed in the die member 12. The apertures 44 serve to receive the nail or other securing member used to secure the finished clamp to a flat supporting surface.

Figures 6, 7, 10, 11, 12, 13:
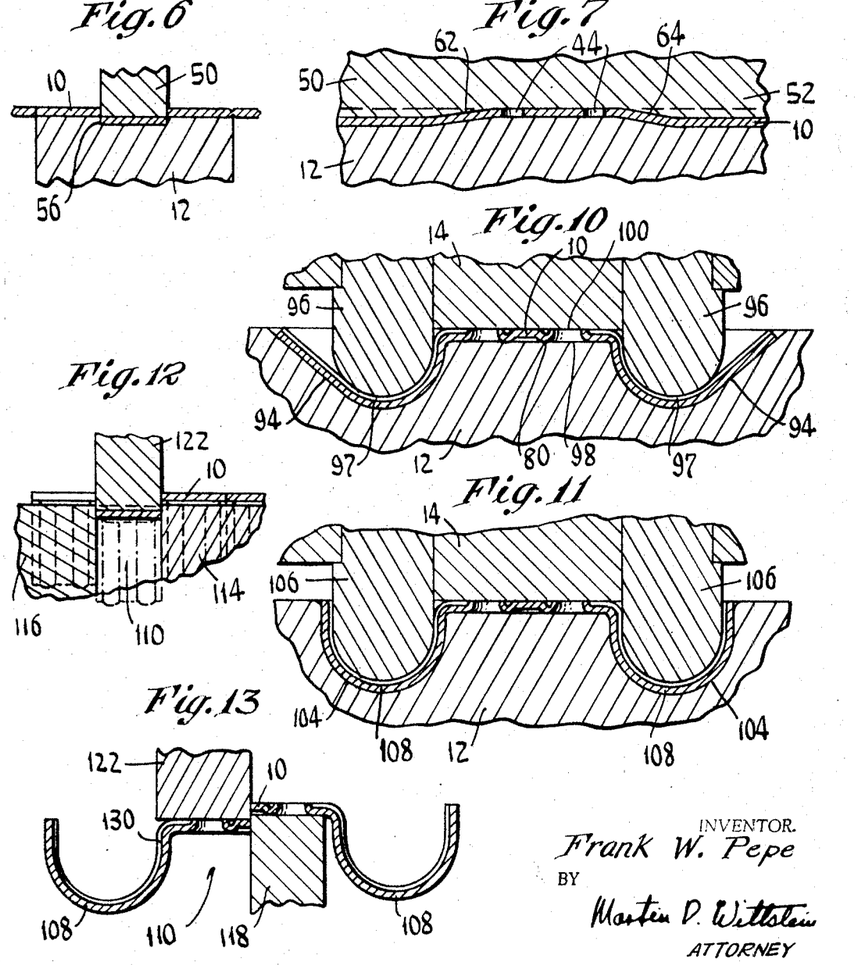
Figure 8:
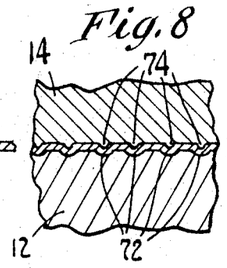

The next important operation takes place in and between the clamp blank areas indicated by the guide numbers 9, 10 and 11, and consists of separating, preferably by lancing, the longitudinal side edges of the opposed clamp blanks of each pair from the strip stock along only a major portion of the side edge of each clamp blank. Thus a pair of substantially rectangular punches 50 and 52 carried by the punch holder 14 in the area indicated by the guide number 10 are adapted to engage with a corresponding pair of rectangular recesses 54 and 56 formed in the die member 12, the punch 50 and mating recess 56 being shown in FIG. 6. The punches 50 and 52 and recesses 54 and 56 extend from the opposite side edges 58 and 60 of the strip 10 toward the centerline thereof, but the punches and recesses terminate short of the strip centerline at the outwardly tapered portions 62 and 64 of the punches, as seen in FIG. 7. Thus the pair of clamp blanks located at the position indicated by the guide number 10 is lanced along the lines 50' and 52' from the side edges of the strip to approximately adjacent the apertures 44, thereby leaving a short length of the side edges of this pair of clamp blanks unseparated from the strip stock so as to provide a central carry through portion 70 for each clamp blank which serves to maintain the individual clamp blanks integrally connected with the strip stock throughout the remainder of the forming operations.

It will not be understood that two laterally adjacent pairs of end to end adjacent clamp blanks have been formed in which each clamp blank of each pair extends from the opposite side edges of the strip stock to the centerline thereof. Each clamp blank of each pair is separated from the strip along the side edges of each clamp blank only over a major portion of the length of the clamp blank, the separation extending from the free end edge thereof toward, but not reaching, the common end edge of each end to end adjacent pair.

The clamp blank areas indicated by the guide numbers 12 and 13 are, again, non-working positions corresponding in function to position number 3, and also to leave room for later inserting tools for additional working operations if desired.

The next forming operation to be carried out, still on the flat clamp blanks, is the ribbing and aperture reinforcing which takes place in the clamp blank areas indicated by the guide numbers 14 and 15. As best seen in FIGS. 3, 4, 8 and 9, the die member 12 is provided with two pairs of elongate parallel recesses 72 into which the strip stock 10 is forced by corresponding pairs of elongate parallel punches 74 carried by the punch holder 14. The recesses 72 and punches 74 form pairs of elongate parallel reinforcing ribs 76 on each clamp blank of each pair, leaving a flat web portion 78 between the ribs 76 on each clamp blank. The ribs extend from the opposite side edges 58 and 60 of the strip stock 10 toward the centerline thereof and terminate approximately adjacent the aperture 44 on each clamp blank.

Figure 9:
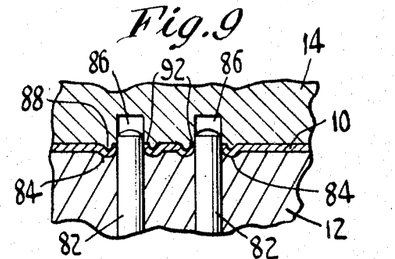

At the same time that the ribs 76 are formed and at the same working location, an annular reinforcing rib 80 is formed on each clamp blank around the aperture 44. These ribs are formed, as best seen in FIG. 9, by a plurality of posts 82 carried by the die member 12 which have a diameter larger than the diameter of the apertures 44, each post 82 being surrounded by an annular recess 84 having the desired configuration of the annular rib 80. The punch holder 14 is provided with a plurality of recesses 86 which are positioned to receive the posts 82, and each recess 86 is surrounded by an annular punch 88 which matches the recess 84 in the die member 12. As best seen in FIG. 1, the several mating punches and recesses above described, both for the longitudinal ribs 76 and the annular ribs 80, are preferably formed so that the longitudinal ribs terminate at, and merge with, the annular rib 80 at the location indicated by the reference numberal 90, thereby producing a continuity of the reinforcing ribs along substantially the full length of the clamp blank as well as completely around the aperture 44.

It will also be noticed that, as a result of the formation of the annular rib 80, the aperture 44 is now larger than in the previous working positions, and it is immediately surrounded and defined by an annular ring or extrusion 92 which provides a flat seating surface around the aperture to help prevent collapse of the annular rib 80 when the clamp is being secured to a supporting surface as fully explained in my aforementioned copending patent application.

It will be appreciated from the foregoing that any desired configuration of ribbing, indenting or other shaping may be performed on the flat clamp blanks at this stage in the progressive forming of the finished clamps. Also, since the clamp blanks are separated from each other over most of their length, yet integrally connected to the strip stock, very exact positioning of the individual clamp blanks between the die member and punch holder is easily achieved with the result that sharp deep ribs with very small connecting radii can be formed having greatly superior accuracy over that possible with prior art methods.

It will now be understood that two pairs of complete flat clamp blanks have been formed which possess all the configurations of the finished clamp with the exception of the curvature defining the hook portion of the clamp.

As will be more fully explained below in connection with alternate forms of the practice of the present invention, some of the foregoing steps may be rearranged in their order of sequence, or they may be entirely omitted.

The next significant step in the practice of the invention is the deforming of the flat clamp blanks over a major portion of the length of the separated portion of the clamp blanks to provide the substantially semi-cylindrical curvature therein which defines the hook portion of the finished clamps. This step is preferably carried out in two forming stages in order to achieve an accurate curvature and uniform sizing from clamp to clamp by reducing the tendency of the metal to spring back to a curvature less than that desired. By virtue of the fact that the deformation takes place from the free end of each clamp blank toward the centerline of the strip, as more clearly explained below, the full deformation may be carried out over as many steps as desired depending on the degree of curvature desired and the strength and elasticity of the metal of the strip stock.

Figure 2:
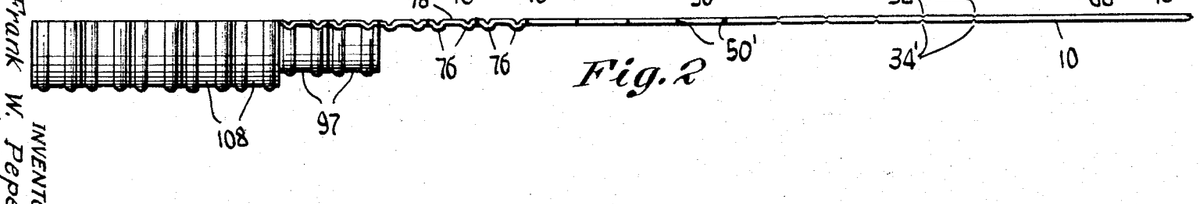
FIG. 2 is a side elevation of the strip stock of FIG. 1.

Referring again to FIGS. 1–4 and also to FIGS. 10 and 11, it will be seen that the die member 12 is provided, at the clamp blank areas indicated by the guide numbers 17 and 18 (area number 16 again being a non-working position), with a plurality of cavities 94 into which the flat clamp blanks are forced by punches 96 carried by the punch holder 14. As best seen in FIG. 10, the cavities 94 have a contoured surface conforming to the ribs previously formed on the flat clamp blank, and have a partially circular configuration adjacent the centerline of the strip which merges into a generally flat surface portion adjacent to and extending to the side edges of the strip 10. The cavities 94 also have a depth which is less than the final desired depth of the hook portion of the finished clamp. As best seen in FIGS. 2 and 10, the punch 96 and cavity 94 form in the clamp blank a curved portion 97 which conforms only partially to the desired finished contour of the hook portion of the clamp.

The inner end of each cavity, as seen in FIG. 10, is spaced from the centerline of the strip 10 by a distance which is at least slightly more than the distance from the centerline of the strip stock to the outer edge of the annular rib 80, thereby providing a flat supporting portion 98 of the die member 12 which extends on each side of the strip centerline. The flat supporting portion 98, together with a corresponding portion 100 of the punch holder 14, forms on each clamp blank a flat area 102 (see FIG. 1) which is the flat end portion of each clamp surrounding the aperture as more fully disclosed in said copending patent application.

A substantially identical forming operation is carried out at the clamp blank areas indicated by the guide numbers 19 and 20 with the exception that the die cavities are deeper and are shaped to the final desired configuration of the hook portion of the finished clamp. Thus, the die member 12 is provided with the cavities 104 on opposite sides of the centerline of the strip 10 and the punch holder 14 is provided with punches 106 which force the partially curved portions 97 of the clamp blanks into the cavities 104 to impart the final curvature thereto to form the hook portion 108 of the finished clamps. As best seen in FIG. 11, the cavities 104 are substantially semi-cylindrical and are deeper than the cavities 94 at the previous working station. Also, upon comparison of FIGS. 10 and 11, it will be seen that the central portion of the die member 12 and punch holder 14 is identical in both figures so that the flat end portion of the clamp blanks remains unchanged in this forming stage.

It will now be understood that a significant advantage of the present invention over prior art methods is based on the forming of a pair of end to end adjacent clamp blanks which extend over the width of the strip stock and are separated therefrom over a major portion of their length from the outer edges of the strip prior to carrying out any forming operation which would alter the length of a flat clamp blank. By thus initially laying out the clamp blanks on the strip, it is possible to form the curvature therein from the side edges of the strip stock, which after lancing, correspond to the free ends of each of the opposed clamp blanks.

As will be readily understood from FIGS. 10 and 11, as the punches 96 and 106 descend into the cavities 94 and 104, the metal of each clamp blank flows into the cavities from the opposite edges of the strip with the result that the tremendous tensile force exerted on the central flat portions 102 of the strip 10 is equalized in both directions across the strip centerline. By achieving this balance of forces on the strip it is relatively easy to maintain proper positioning of the strip in the die cavities and produce more accurate and uniform sizing of the hook portions. In addition, since the clamp blanks are separated from each other over at least the length thereof that is to be curved, and the metal flows from the free end of each clamp blank, the final curvature can be formed in a succession of stages rather than in one deep forming stage as required by prior art methods, thereby assuring a more accurate set to the curved portion of the clamps.

It should also be noted that since the individual clamp blanks are moving through the progressive stages of the die member and punch holder in a direction normal to the longitudinal axes of the clamp blanks, the strip as a whole can readily move from one working station to another without the aid of any complex ejecting mechanism since the individual forming cavities are open along their lateral edges.

The final significant step in the practice of the present invention is the severing of the finished clamps from the strip, the severing being carried out in the same multiple arrangement as the previous forming steps so that as many finished clamps are simultaneously severed from the strip and from each other as the number of clamp blanks formed in the previous working operations. It has been found that the most desirable way to sever the clamps is to simultaneously knock off either the terminal or next to last pair of diagonally adjacent clamps from the strip as by shearing along the unseparated portions of the side edges of the clamps and along the common end edge of the terminal pair of end to end adjacent clamps.

Referring again to FIGS. 1–4 and also to FIGS. 12 and 13, it will be seen that the severing operation, in the preferred practice of the invention, takes place in the clamp blank areas indicated by the guide numbers 22, 23 and 24, the area indicated by guide number 21 being another non-working position. The die member 12 is provided with a cavity 110 which extends from the center of the die member toward one outer edge thereof and underlies a complete clamp so that any clamp disposed over this cavity is completely unsupported by any portion of the die member 12. A similar cavity 112 is disposed diagonally opposite to the die cavity 110, that is, it is located in the next clamp blank area (23 instead of 22) and extends from the center of the die member 12 toward the opposite outer edge thereof. Both of these cavities 110 and 112 are disposed between solid supporting portions of the die member 12, that is, the cavity 110 is located between supporting portions 114 and 116, and the cavity 112 is located between the supporting portions 118 and 120. It should be understood that the supporting portions 116 through 120 extend from the center of the die member toward the opposite side edges thereof only to the extent that they underlie the flat end portions 102 of the clamps so as not to interfere with movement of the curved portions 108 of the clamps from the final forming cavities.

In a similar manner, the punch holder 14 is provided with a pair of rectangular diagonally opposite punches 122 and 124, the punch 122 being located in the clamp blank area indicated by the guide number 22 and extending from the center of the punch holder toward the edge thereof which is coincident with the first abovementioned edge of the die member 12 so that the punch 122 is aligned with the cavity 110. Similarly, the punch 124 is located in the next clamp blank area and extends from the center of the punch holder toward the opposite edge thereof, so that the punch 124 is aligned with the cavity 112.

Assuming that at least one previous partial severing operation has taken place so that the last pair of clamps still attached to the strip is the diagonally adjacent pair of clamps indicated by the reference numerals 126 and 128 in FIG. 1, when the strip stock 10 is advanced the next increment, the clamp 126 will be located over the die supporting surface 116, the clamp 128 will be located over the die supporting surface 120, and the next to last diagonally adjacent pair of clamps 130 and 132 will be disposed over the die cavities 110 and 112 respectively. With the strip stock in this position, when the punch holder descends with the punches 122 and 124, the clamps 130 and 132 are forced through the cavities 110 and 112 respectively, while the clamps 126 and 128 remain on the supporting surfaces 116 and 120 respectively. Thus each of the clamps 126, 128, 130 and 132 are simultaneously severed along the unseparated portions of the side edges of the two pairs of diagonally adjacent clamps just enumerated, as well as along the common inner end edge between the last two pairs of end to end adjacent clamps, that is, the common end edge between clamps 126 and 132, and between clamps 130 and 134, whereby the clamps 126, 128, 130 and 132 are simultaneously severed from each other and from the strip.

Thus it will be understood that as the strip is advanced in increments of two pairs of clamp blanks, alternate diagonally adjacent pairs of finished clamps are punched through the die member, these being the next to last diagonally adjacent pair for each operating cycle of the punch press, and the terminal diagonally adjacent pair for each operating cycle of the punch press remains on the die supporting surfaces, or the severed clamps fall into a receptacle. As a result of this severing action, four finished clamps are severed from the strip with each said operating cycle of the punch press.

It should also be understood that the strip stock may be fed through the progressive die member and punch holder in any desired increment including only a single pair of clamp blanks, in which case it would be the terminal diagonally adjacent pair of clamps that would be punched through the die cavities 110 and 112, and only a single end to end adjacent pair of clamp blanks would be formed in any preceeding working station. On the other hand, it is possible to feed the strip stock in increments of three or more pairs of clamp blanks providing as many pairs of clamp blanks are formed at each of the working stations, and provided further that there are a sufficient number of alternate pairs of diagonally adjacent cavities and supporting surfaces in the die member and a corresponding number of pairs of diagonally adjacent punches on the punch holder for each set of cavities. In general, the smaller the clamp being formed and the softer the metal of the strip stock, the more clamps which can be formed with each operation of the punch press.

As briefly indicated above, certain of the above described steps may be rearranged in sequence or may be entirely omitted without departing from the scope of the invention or from the basic procedure of the present form of practice of the invention. For example, the coining steps, both longitudinally and laterally of the strip stock, may be combined into a single working station, or the coining may be motted, thereby relying on the lancing step to initially form the individual clamp blanks. The advantage of coining before lancing is to provide clean and smooth edges on the clamps which are as free of burrs as possible. In addition, the aperture forming step may be combined with one or both of the coining steps or it may be combined with the lancing step. It could also be combined with either the ribbing step or the curvature forming step, although it is preferable to have an initial aperture before the annular rib around the aperture is formed. The longitudinal ribbing can be carried out at any stage prior to forming the initial curvature for the hook portion of the clamp, but again, it is preferable to do the longitudinal ribbing after the clamp blanks have been separated by lancing.

It is thus seen that the practice of the present invention is quite flexible in regard to a number of the preferred steps described above. The critical steps which must be followed in a particular sequence are the initial forming of the pairs of end to end adjacent partially separated clamp blanks, the deformation of the clamp blanks from the opposite free ends of the pair toward the center of the clamp blank strip, and the severing of the clamps from the strip in numbers corresponding to the number of clamp blanks simultaneously formed in the previous working stations.

Figure 14:
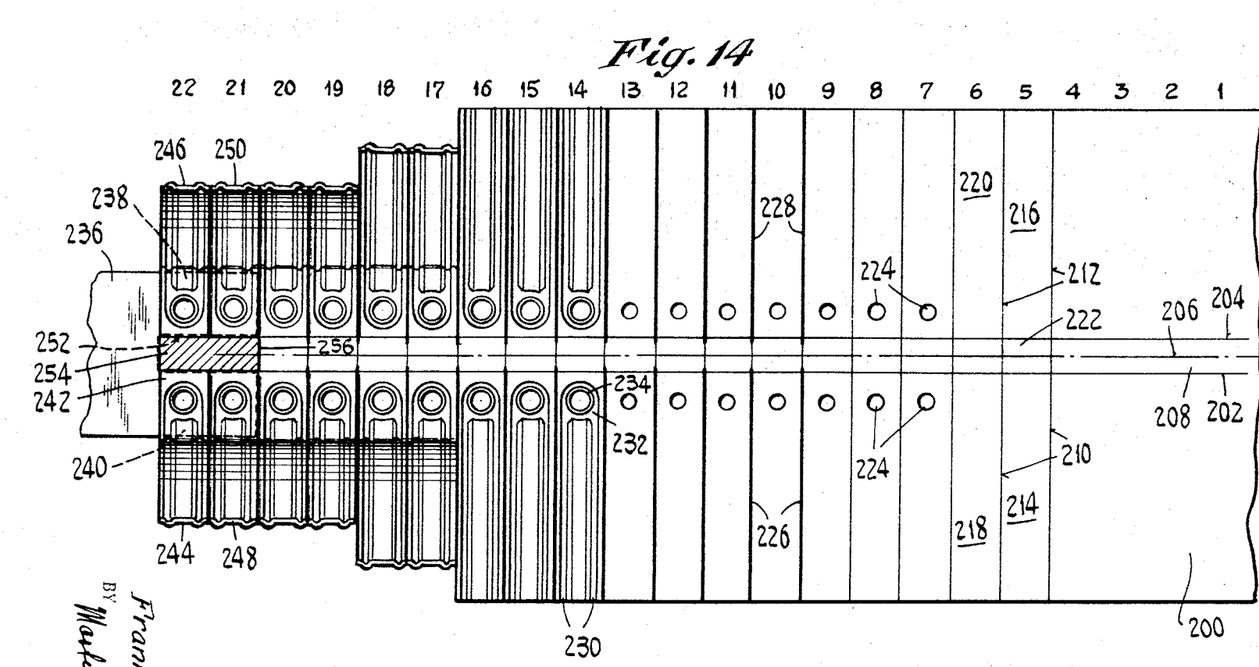
FIG. 14 is a view similar to FIG. 1 of a strip stock formed by an alternative practice of the present invention.

Referring now to FIG. 14, there is shown, and hereinbelow described, an alternative practice of the present invention which has the advantage over the above described practice of requiring less complicated and less expensive punching parts in the clamp severing step of the method. However, it suffers the disadvantage of entailing a certain amount of waste material for each pair of clamps severed from the strip. The two forms of the invention have many features in common up to the severing step, but are quite different at this stage of operation as more particularly described below. It should be understood that FIG. 14 is a view similar to FIG. 1, with the necessary severing parts superimposed thereon, and it is believed that all of the other die and punch forming parts will be readily apparent from a description of the steps involved in the progressive formation of the strip shown in FIG. 14, taken with the knowledge of the die and punch parts required for the formation of the strip shown in FIG. 1. Therefore further views in connection with this alternative form of the invention are not deemed necessary.

The strip 200 is substantially the same as the strip 10 and is fed through the progressive die and punch members in the same direction and manner as the strip 10 in the previous form of the invention. At the clamp blank areas indicated by the guide members 1 and 2, a pair of spaced parallel notches 202 and 204 are coined into the opposed surfaces of the strip stock 200 by coining punches correspondingly located on the die member and punch holder, the notches 202 and 204 being spaced equi-distant from the centerline 206 of the strip. The coined notches 202 and 204 define a central area 208 of the strip which functions as a carry through portion for the individual clamp blanks, as more clearly seen hereinafter.

The next step in laying out the clamp blanks on the strip stock 200 is to coin the opposite surfaces of the strip 200 laterally, the coining being done in pairs of coined notches 210 and 212 and extending across the full width of the strip stock 200. This coining is performed by the same type of coining punches as used in the previous embodiment, which are located between the clamp blank areas indicated by the guide numbers 4 and 5, and 5 and 6. The coining thus produces the four elongate end to end adjacent clamp blanks 214, 216, 218 and 220; however, the individual clamp blanks of these pairs do not share a common end edge on the centerline of the strip 200, but rather are spaced slightly from each other to leave a small area of strip stock 222 between each clamp blank of a pair for a purpose to become more clear hereinafter.

As in the previous form of the invention, apertures 224 are punched in each clamp blank at the clamp blank areas indicated by the guide numbers 7 and 8, these apertures being located adjacent the longitudinal coined notches 202 and 204.

The next step is the lancing of the individual clamp blanks to separate the side edges thereof from the strip, the lancing taking place along the side edges of the clamp blanks indicated by the guide number 10. The side edges 226 and 228 are lanced from the outer edges of the strip 200 to a point just slightly inwardly of the longitudinal coined notches 202 and 204 but not to the centerline of the strip. Thus the clamp blanks in this form of the invention are separated from the strip along their side edges over the entire length of the clamp blanks, but not along the end edges thereof defined by the coined notches 202 and 204, thereby maintaining the individual clamp blanks integrally connected to the strip stock 200 through the central carry through area 222 between the clamp blanks.

The next step in this practice of the invention is the formation of the longitudinal ribs 230 and the annular ribs 232 surrounding the aperture 224, together with the forming of the aperture defining annular ring or extrusion 234. These shapes are formed in the two pairs of clamp blanks located at the areas indicated by the guide numbers 14 and 15 in substantially the same manner as in the previous form of the invention and accordingly further description thereof is not deemed to be necessary.

At this stage in the progressive formation of the clamps, two pairs of flat clamp blanks are completed and ready for forming to the final shape of the clamps. As in the previous form of the invention, the hook portion of the clamps is formed in the clamp blanks in two stages, with a partial curvature being formed in a the clamp blanks located at the areas indicated by the guide numbers 17 and 18, and a full curvature being formed in the clamp blanks located at the areas indicated by the guide numbers 19 and 20. Again, this partial and full curvature forming is carried out by means of a punch and die arrangement which is substantially identical to that described above, so that further detailed description thereof is not deemed necessary, except to note that the punch and die construction for carrying out the two stages of the curvature forming operation must provide for maintaining the central carry through area 222 flat and not in any way incorporated into the clamp blank areas.

The final step in the practice of this form of the invention is the severing of the finished clamps from the strip stock in multiples equal to the number of individual clamp blanks simultaneously formed and worked on in the previous working operations. As seen at the left end of FIG. 14, the die member is provided with a die part part 236 having a pair of clamp supporting fingers 238 and 240 which underlie only that part of the strip stock 200 defined by the flat end portion 242 of each clamp 244, 246, 248 and 250 of the last two pairs of clamps. The supporting fingers 238 and 240 define therebetween a rectangular cavity 252 which underlies only that portion of the strip occupied by the central carry through portion 222 of the strip 200 between the inner end edges of the clamps 244, 246, 248 and 250. The punch holder carries a punch 254 which is located and shaped to be aligned with and fit into the cavity 252 between the fingers 238 and 240. It will not be apparent that when the punch 254 descends into the cavity 252, the central carry through area 222 underlying the punch 254 will be severed from the strip along the remaining unseparated portion of the coined notch indicated by reference numeral 256 as well as along the inner end edges of the clamps 244, 246, 248 and 250, which are already separated along their entire side edges, whereby the four enumerated clamps are simultaneously separated from the strip and from each other. It will of course be recognized that the portion of the central carry through area 222 punched out is waste material. However, this disadvantage, as will now be understood, is offset by the much less complex severing parts required for this form of the invention. It should be noted that in order to adapt these severing parts to sever more than two pairs of clamps at one time, it is only necessary to extend the length of the supporting fingers 238 and 240, and the length of the punch 254, to cover as many pairs of clamps as desired.

It will be apparent from the foregoing that there has been disclosed a method of forming single hole clamps which achieves the foregoing objects and advantages of the invention. It is to be understood that the invention is not to be deemed limited to the specific presently preferred practices described above the steps of which can be in part rearranged or omitted without departing from the spirit and scope of the invention, but rather the invention is intended to cover all such arrangements and variations thereof as may be encompassesd by the scope of the claims appended hereto.

What I claim and desire to secure by Letters Patent is:

1. A method of continuously forming conduit clamps from flat strip stock of indefinite length, said method comprising the steps of
   (A) intermittently feeding a flat strip stock past a plurality of serially arranged working stations at which a plurality of working operations are simultaneously carried out during the dwell portions of the intermittent feeding of the strip,
   (B) forming at a first working station at least one pair of elongate end to end adjacent clamp blanks such that each clamp blank of the pair extends from an opposite side edge of the strip stock toward the center thereof and each clamp blank of the pair of separated from the strip stock along the side edge of each clamp blank over at least a major portion of its length from said opposite side edges of the strip stock toward the center thereof,
   (C) deforming at a subsequent working station each clamp blank of the pair to provide a substantially semi-circular curvature therein which extends from the free end edge of each clamp blank toward the center of the strip stock over a major portion of the separated portion of each clamp blank to provide at least one pair of finished clamps still integrally connected to the strip stock, and
   (D) severing at a terminal working station at least the terminal pair of finished clamps along the unseparated end edge of said terminal pair of finished clamps whereby at least two individual clamps are simultaneously separated from the strip stock and from each other.

2. A method as set forth in claim 1 wherein
   (A) said forming at said first working station includes simultaneously forming at least two pairs of end to end adjacent clamp blanks such that the side edges of each clamp blank of each pair are separated from each other and the side edges of each clamp blank of one of the pairs is separated from the strip stock, both of said side edge separations extending over said major portion of the length of each clamp blank of each pair,
   (B) said deforming at said subsequent working station includes simultaneously deforming at least two pairs of end to end adjacent clamp blanks to provide at least two pairs of finished clamps still integrally connected to the strip stock, and
   (C) said severing at said terminal working station includes simultaneously severing at least two terminal pairs of finished clamps along the unseparated end edges of said terminal pairs of finished clamps whereby at least four individual clamps are simultaneously separated from the strip stock and from each other.

3. A method as set forth in claim 1 wherein said forming of said pair of clamp blanks comprises the steps of
   (A) coining at a first working station the opposite surfaces of said strip stock both longitudinally and laterally thereof at spaced intervals to define respectively one end edge and the side edges of each clamp blank of said pair of end to end adjacent clamp blanks, and
   (B) lancing at a second working station said side edges of each clamp blank of said pair along at least said major portion of the length of each clamp blank from said opposite side edges of said strip toward the center thereof.

4. A method as set forth in claim 1 wherein said deforming of each clamp blank of said pair is carried out by simultaneously forcing said major portion of said separated portion of each clamp blank into a die member having spaced apart cavities therein defining the curvature to be imparted to each clamp blank such that the metal of each clamp blank flows into said cavities from the free end edge of each clamp blank and the tensile forces from the deformation of each clamp blank are balanced across the unseparated flat portion of each clamp blank.

5. A method as set forth in claim 4 wherein said deforming of each clamp blank of said pair is carried out in a plurality of stages wherein said die cavities of a first stage define only a partial curvature relative to the final shape to be provided and the die cavities of a subsequent stage define the final curvature to be provided in each clamp blank whereby the curvature in each clamp blank is more accurately set.

6. A method of continuously forming conduit clamps from flat strip stock of indefinite length, said method comprising the steps of
(A) intermittently feeding a flat strip stock past a plurality of serially arranged working stations at which a plurality of working operations are simultaneously carried out during the dwell portions of the intermittent feeding of the strip,
(B) forming at a first working station at least one pair of elongate end to end adjacent clamp blanks such that said pair of clamp blanks extends across the full width of the strip stock and each clamp blank is separated from the strip stock along the side edge of each clamp blank over only a major portion of the length of each clamp blank and extends from the free end edge of each clamp blank toward the common end edge thereof,
(C) deforming at a subsequent working station each clamp blank of the pair to provide a substantially semi-circular curvature therein which extends over at least a major portion of the separated portion of each clamp blank to form at least one pair of finished clamps, and
(D) simultaneously severing at a terminal working station at least the terminal pair of diagonally adjacent clamps along the unseparated side edge portions of each clamp blank of said diagonally adjacent pair and along the common end edge of the terminal pair of end to end adjacent clamps whereby at least two individual clamps are simultaneously separated from the strip and from each other.

7. A method as set forth in claim 6 wherein said forming of said pair of clamp blanks comprises the steps of
(A) coining at a first working station the opposite surfaces of said strip stock both longitudinally along the centerline of said strip stock and laterally thereacross at spaced intervals to define respectively said common end edge and said side edges of said pair of end to end adjacent clamp blanks, and
(B) lancing at a second working station said side edges of each clamp blank of said pair along only said major portion of the length of each clamp blank from said free end edge thereof toward said common end edge thereof.

8. A method as set forth in claim 6 wherein said deforming providing the semi-circular curvature in each said clamp blank is carried out on substantially all of said separated major portion of the length of each said clamp blank, the remaining unseparated portion of the length of each said clamp blank being maintained substantially flat.

9. A method as set forth in claim 6 wherein said severing is carried out by punching said terminal pair of diagonally adjacent clamps out of the plane of said strip stock while supporting the next to terminal diagonally adjacent pair of clamps in the plane of said strip stock whereby the individual clamps of said terminal diagonally adjacent pair are simultaneously sheared from the strip stock and from each other.

10. A method as set forth in claim 6 wherein
(A) said forming at said first working station includes simultaneously forming a plurality of pairs of end to end adjacent clamp blanks with the side edges of each clamp blank of each pair being separated from each other and from the strip along said major portions of said side edges,
(B) said deforming at said subsequent working station includes simultaneously deforming a corresponding plurality of pairs of end to end adjacent clamp blanks to provide a corresponding plurality of pairs of finished clamps, and
(C) said severing at said terminal working station includes simultaneously severing a corresponding plurality of terminal pairs of diagonally adjacent clamps along the unseparated side edge portions of each clamp of each diagonally adjacent pair and along the common end edge of a corresponding plurality of terminal pairs of end to end adjacent clamps, whereby twice as many individual clamps are simultaneously separated from said strip and from each other as there are pairs of clamps being formed.

11. A method as set forth in claim 10 wherein said severing is carried out by punching the next to terminal pair of diagonally adjacent clamps out of the plane of said strip stock while supporting both the terminal and second to terminal pair of diagonally adjacent clamps whereby the individual clamps of both said terminal and next to terminal diagonally adjacent pairs are simultaneously sheared from the strip stock and from each other.

12. A method of continuously forming conduit clamps from flat strip stock of indefinite length comprising the steps of
(A) intermittently feeding a flat strip stock past a plurality of serially arranged working stations at which a plurality of working operations are simultaneously carried out during the dwell portions of the intermittent feeding of the strip,
(B) forming at a first working station at least one pair of elongate end to end adjacent clamp blanks such that said pair of clamp blanks extends from the opposite side edges of said strip stock toward the center thereof with each clamp blank of the pair terminating at an inner end edge closely spaced from said center thereby excluding an inner area of said strip stock from said pair of clamp blanks, each clamp blank of the pair being separated from the strip stock along the side edges of each clamp blank over at least the entire length of each clamp blank,
(C) deforming at a subsequent working station each clamp blank of the pair to provide a substantially semi-circular curvature therein which extends over a major portion of the length of each clamp blank to form at least one pair of finished clamps still integrally connected to said strip stock, and
(D) simultaneously severing at a terminal working station at least the terminal pair of end to end adjacent clamps along the unseparated spaced apart inner end edge of each clamp of the pair and along the side edge of the inner area of said strip stock excluded from said clamps whereby at least two individual clamps are simultaneously separated from the strip and from each other.

13. A method as set forth in claim 12 wherein said forming of said pair of clamp blanks comprises the steps of
(A) coining at a first working station the opposite surfaces of said strip stock both longitudinally in spaced parallel proximity to the centerline of said strip stock and laterally thereacross at spaced intervals to define respectively said spaced apart inner end edges and said side edges of said pair of end to end adjacent clamp blanks, and (B) lancing at a second working station said side edges of each clamp blank of said pair along at least said entire length of each clamp blank.

14. A method as set forth in claim 12 wherein said severing is carried out by punching said inner area of said strip stock between the clamps of at least said terminal pair of end to end adjacent clamps out of the plane of said strip stock while supporting said terminal pair of clamps in the plane of said strip stock whereby the individual clamps of said terminal pair are simultaneously sheared from the strip stock and from each other.

15. A method as set forth in claim 14 wherein said punching is carried out simultaneously along said inner area of said strip stock between the clamps of at least two terminal pairs of end to end adjacent clamps while supporting at least said two terminal pairs of clamps in the plane of said strip stock whereby the individual clamps of said two terminal pairs are simultaneously sheared from the strip stock and from each other.

References Cited

UNITED STATES PATENTS

| | | | |
|---|---|---|---|
| 866,024 | 9/1907 | Hansen | 72—325 |
| 1,270,059 | 6/1918 | Schaefer | 72—333 |
| 1,771,159 | 7/1930 | Bowman | 72—333 |
| 3,074,150 | 1/1963 | Berg | 72—325 |
| 3,262,299 | 7/1966 | Hart et al. | 72—405 |

RONALD D. GREFE, Primary Examiner

U.S. Cl. X.R.

72—337, 405